United States Patent [19]
Tawil et al.

[11] Patent Number: 5,500,529
[45] Date of Patent: Mar. 19, 1996

[54] APPARATUS AND METHOD FOR SCREENING ABNORMAL GLOW CURVES

[75] Inventors: Riad A. Tawil, Kirtland, Ohio; Yao Tan, Genova, Italy; Joseph Rotunda, Cuyahoga Falls, Ohio

[73] Assignee: Saint-Gobain/Nortn Industrial Ceramics Corporation, Worcester, Mass.

[21] Appl. No.: 270,902

[22] Filed: Jun. 28, 1994

[51] Int. Cl.$^6$ .................................................. G01T 1/115
[52] U.S. Cl. ........................................ 250/337; 250/484.3
[58] Field of Search .................................. 250/337, 484.3

[56] References Cited

U.S. PATENT DOCUMENTS

| 4,827,131 | 5/1989 | Moscovitch | 250/337 |
| 4,827,132 | 5/1989 | Moscovitch | 250/337 |

OTHER PUBLICATIONS

Lucas, "Glow–curve Analysis", Applied Thermoluminescence Dosimetry, Eds. Oberhofer and Scharmann, Chapter 13, 1981, pp. 259–269.

Dosimetry Services Company, Pamphlet entitled, "Glow Curve Analysis", copyright 1992.

Primary Examiner—Carolyn E. Fields
Assistant Examiner—Edward J. Glick
Attorney, Agent, or Firm—Volker Ulbrich; Don Bulson

[57] ABSTRACT

Apparatus and method for electronically screening abnormal glow curves of thermoluminescenct materials such as LiF:Mg,Ti in routine dosimetry, wherein glow curves with abnormal patterns are identified by examining a few key features from which information about background and thermoluminescent (TL) signals can be extracted. By analyzing the records of quality control (QC) cards that are in the same group as field cards, dosimeter- and reader-dictated parameters, such as the peak location, are automatically determined, thus eliminating the need for any prior knowledge of those conditions required for reference determination. The apparatus and method are applicable to dose levels down to at least 50 µSv.

6 Claims, 2 Drawing Sheets

APPARATUS AND METHOD FOR SCREENING ABNORMAL GLOW CURVES

The invention herein described relates generally to thermoluminescent dosimetry and, more particularly, to an apparatus and method for screening abnormal glow curves.

BACKGROUND

As radiation monitoring and protection become an increasingly important issue, the growth in the scale of routine dosimetry is inevitable. A well established and widely employed dosimetry technique is thermoluminescence dosimetry (TLD) using LiF as the host material. U.S. Pat. No. 5,065,031 describes a representative multi-element TL dosimeter together with a dose calculation method which were designed to enable users to meet the ever growing demands of modern personnel dosimetry and also environmental monitoring. The therein described dosimeter is composed of two parts, namely a TLD card and a holder. The TLD card includes multiple thermoluminescent (TL) elements and the holder includes associated tissue equivalent radiation modifying filters.

Dose information is generally extracted from the integral area under the glow curve or part of the glow curve. Errors in such measurements may arise from the existence of background and the complex nature of fast-fading glow peaks. Much effort has been devoted to improving the accuracy of dose measurement by subtracting background signal and by eliminating contributions from the fast-fading glow peaks.

In routine dosimetry, where accuracy is not a critical issue, dosimetric information is, for practical reasons, approximated by the total area under the glow curve. The validity of such practice is ensured by carefully examining each individual glow curve and eliminating spurious readings before they can be used in dose algorithms, as discussed in Moscovitch, M., Chamberlain, J. and Velbeck, K. J., *Dose Determination Algorithm for a Nearly Tissue-equivalent Multi-element Thermoluminescent Dosimeter*, In: Proc. 2nd Conf. on Radiation Protection and Dosimetry, Orlando, Fla. ORNL/TM-1097, pp. 48–59 (1988).

Currently glow curve screening is predominantly done manually. This is not only time consuming, but also highly subjective in the pass/fail decision making. Existing analysis programs can not help change this situation because many features of the underlying methods are not compatible with the practical requirements of routine dosimetry.

For example, intrinsic glow curve characteristics, i.e., the location of the main glow peak and its width, are adversely affected by a host of factors such as the chip thickness, electronics of the card-reading instrument, and heating profile used for the readout. If all cards in a group are of the same type and are read in a relatively short time frame (say, one day) by the same reader, one can reasonably expect these glow curves to exhibit keen proximity in shapes. The expected or established values of these parameters are herein referred to as the "glow curve standards". Because these glow curve standards are largely determined by factors that are different from user to user, it is impossible to arrive at a universal set of parameters that are applicable to all users.

SUMMARY OF THE INVENTION

The present invention provides an apparatus and method for electronically analyzing the shape of glow curves of thermoluminescent materials including, in particular, LiF:Mg,Ti . The apparatus and method enable automatic recognition of faulty features in the shape of a glow curve which, upon confirmation by visual inspection, can be used to invalidate incorrect data. In addition, the apparatus and method provide automatic estimation of background and regions with dosimetric information.

The problem of glow curve standards being largely determined by factors that are different from user to user is overcome by utilizing quality control (QC) cards that are interspersed in groups of field cards during card reading. The values of the intrinsic parameters for field glow curves can be predicted from the corresponding aspects of the QC curves. Certain tolerances preferably are set to take into account chip-to-chip variations and variations in heat transfer from the heating element to the TL elements. This methodology enables the determination of glow curve standards without any prior knowledge of the aforementioned conditions. The QC cards may be the same cards previously used to monitor reader performance, the TL element or elements of such cards having been exposed to a known quantity of radiation to provide an expected response when read in the reader.

Irregular glow curves are automatically recognized by identifying one or more glow curve features and testing them against a set of criteria that may be established empirically for the particular application being addressed. The faulty features in glow curve shape, or abnormal conditions, that are recognized include: 1) saturation of readout, 2) spikes caused by electrical interference, 3) lack of a glow peak, 4) glow peak occurs at unexpected temperature, 5) distortion caused by non-radiation induced signal, 6) high IR tail or high residual signal, 7) end of acquisition before completion of glow curve, 8) high background and 9) abnormal glow curve width.

The foregoing and other features of the invention are hereinafter fully described and particularly pointed out in the claims, the following description and the annexed drawings setting forth in detail a certain illustrative and preferred embodiment of the invention, this being indicative, however, of but one of the various ways in which the principles of the invention may be employed.

DETAILED DESCRIPTION

Figure 1:
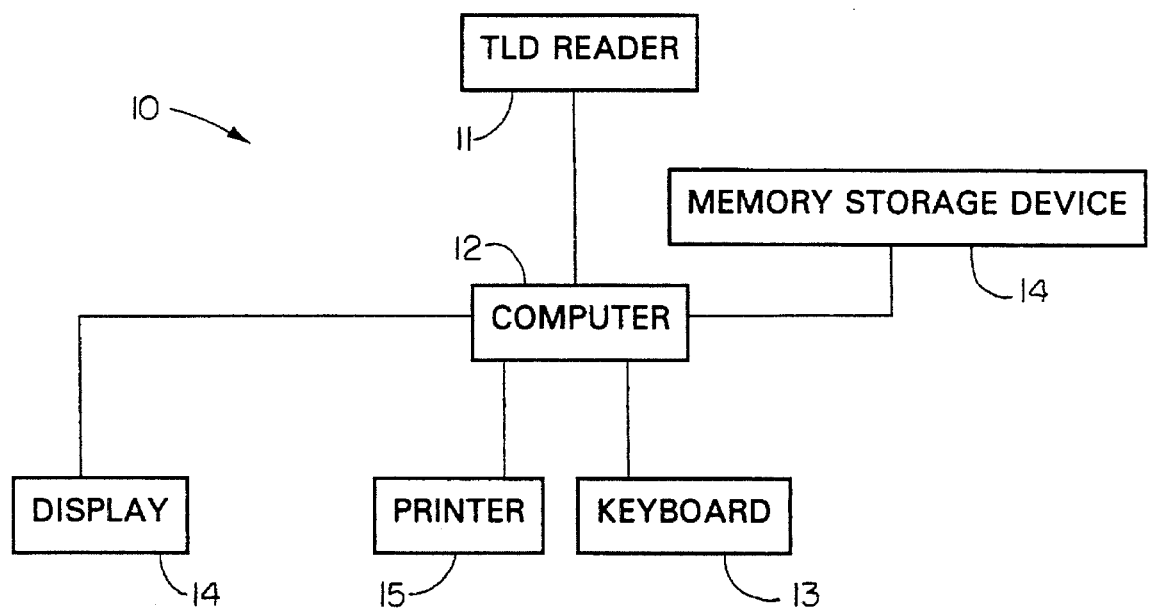
FIG. 1 is a diagrammatic illustration of a glow curve evaluation system according to the invention.

Referring now in detail to the drawings and initially to FIG. 1, a system for obtaining and evaluating thermoluminescent glow curves for conformity to a predefined pattern is diagrammatically illustrated in FIG. 1. The system, indicated generally at 10, includes a TLD reader 11, a computer 12, an input device such as a keyboard 13, a data storage device 14, and one or more output devices such as a display 14 and printer 15, all suitably interfaced with respect to one another. Each of the individual components may be selected from readily available hardware items and readily configured to carry out the functions hereindescribed.

The TLD reader 11 may be of any suitable type operable to read thermoluminescence of a TL element 16 (or elements) when heated and provide glow curve data representative of the radiation dose absorbed by the TL element(s). A preferred TLD reader is one capable of automatically processing one or more TLD cards which may contain one or more TL elements. A preferred TLD reader also is capable of digitizing the glow curve and transmitting the digitized glow curve data to another electronic device such as computer 12 which analyzes the glow curve data to obtain meaningful radiation information. The reader may employ electrical planchet, hot gas or optical heating with a linear heating rate and, preferably, the heating rate and maximum temperature can be varied according to the characteristics of the TL material employed. TLD readers having these and other capabilities are Models 8800 and 6600 TLD readers sold by Harshaw/Bicron Radiation Measurement Products, Solon, Ohio. In the case of a typical four element card, the TL signal may be accumulated simultaneously from the four TL elements in a card via a charge integration technique using four thermoelectrically cooled photomultipliers.

The computer (which may also be referred to as a processor) may be of any suitable type operable to analyze the glow curve data acquired by the TLD reader or equivalent device in accordance with the below described analysis procedure. The computer preferably is a microcomputer suitably programmed to carry out the following glow curve evaluation procedure and report the results of the analysis to the display, printer and/or data storage device. The computer may be directly interfaced with the TLD reader to receive and store the glow curve data. As an alternative to a direct connection, glow curve data acquired by the reader may be stored in a memory device such as on a floppy disk for transfer to the computer which may then be located at a remote location.

The following description of a preferred system and method according to the invention is made in relation to glow curves acquired from TL elements composed of LiF:Mg,Ti, which is a widely accepted material used in thermoluminescence dosimetry. Although the following description for the most part is specifically directed to evaluation of LiF:Mg,Ti glow curves, it should be understood that one or more principles of the present invention may be used with other types of TL materials including, for example, LiF:Cu, $CaSO_4$:Dy, $Li_2B_4O_7$:Cu, $CaF_2$:Tm, and $MgB_4O_7$:Dy.

As is well known, the glow curve is TL signal intensity as a function of temperature or heating time. The digitized glow curve accordingly comprises plural data points each defined by a time or temperature value (often referred to by channel number) and the corresponding TL signal value. The following description is directed to glow curves obtained by the aforesaid readers which provide 200 data points (channels) per glow curve.

A typical glow curve acquired by a conventional TLD reader is composed of overlapping TL peaks over a temperature range of from about room temperature to about 300° C. The peaks (for LiF:Mg,Ti) are conventionally denoted peaks 2 through 5. The composite glow curve also includes components arising from instrumental and dosimeter background.

Figure 2:
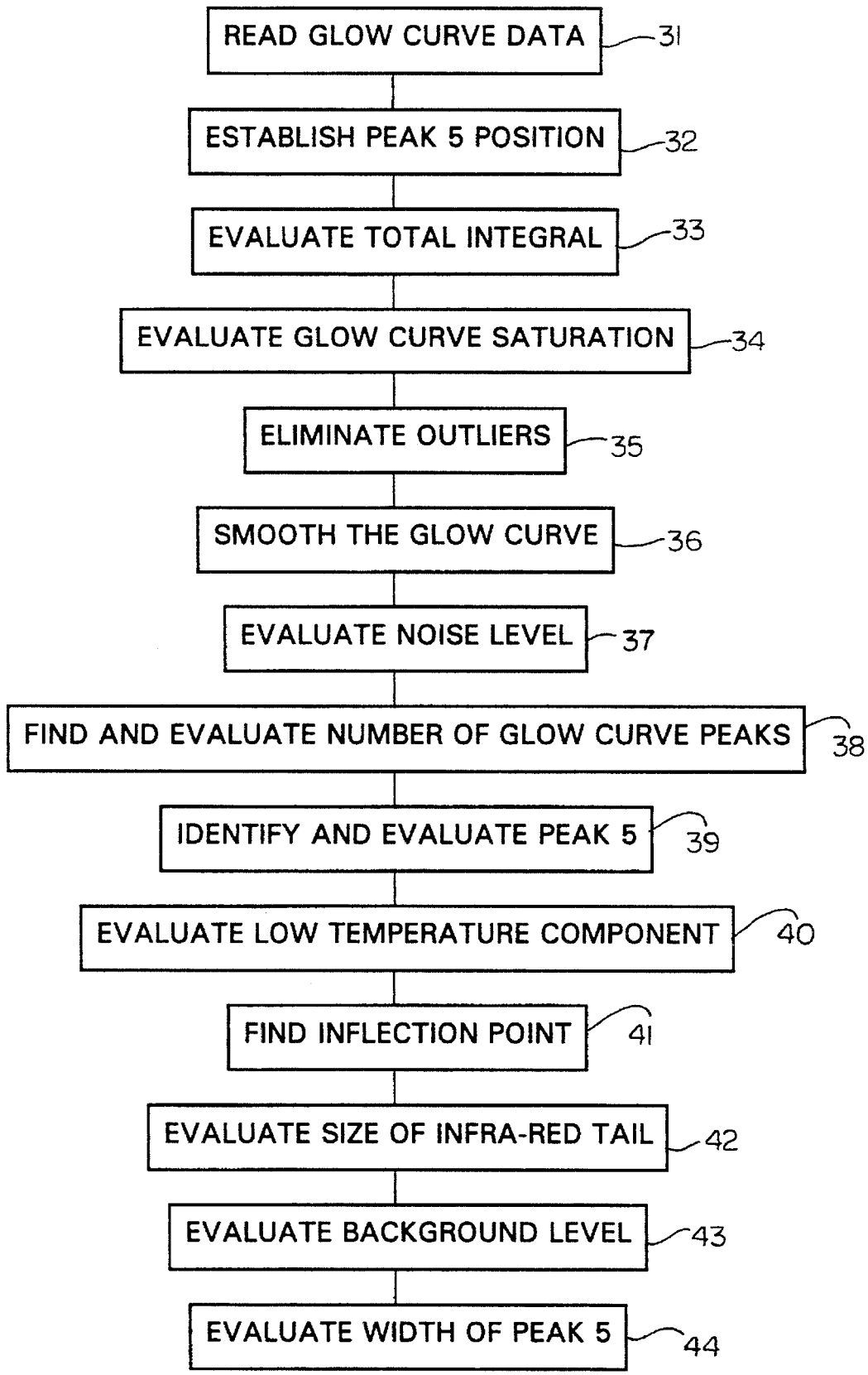
FIG. 2 is a flow chart diagram illustrating the several operational steps of a method according to the invention.

With reference to FIG. 2, the evaluation of a digitized glow curve according to the invention will now be described. Such evaluation is controlled by and carried out automatically by the computer 12 (FIG. 1). The information presented in the flow chart of FIG. 2 and further detailed below may be reduced in conventional manner to computer program language. It also will be appreciated that modes other than the herein described mode may be employed while still embodying principles of the present invention.

Generally the glow curve screening procedure proceeds through a logical decision tree to determine which glow curves are likely to have faulty features and need visual inspection. The procedure is as follows:

1. Read Glow Curve Data

Initially, in block 31, the digitized composite glow curve data for a batch of cards (both field and quality control cards containing one or more TL elements) may be stored in a suitable storage device such as the memory storage device 14 (FIG. 1). The data is then available for evaluation and by be accessed (acquired) by the computer 12 (FIG. 1) as needed.

2. Establish Peak 5 Position

A common practice is to intersperse quality control (QC) cards in a group of field cards during card reading to monitor reader performance. The TL element(s) of the quality control cards are exposed to a predetermined quantity of radiation for providing a predictable glow curve against which reader performance may be compared. A lack of correspondence between the glow curve obtained by the reader and the predicted glow curve is indicative of a reader malfunction or some other problem.

The present invention uniquely utilizes the QC cards for predicting the values of intrinsic parameters for field glow curves by using corresponding aspects of the QC cards. More particularly, in block 32, the glow curve data for the QC cards is used and an average is obtained for the position of peak 5 in each element position of the card and the full width at half maximum height (FWHM) of the composite glow curve. The peak 5 and FWHM are then available for use as standards for evaluating the field glow curve data.

It is noted that provision may be made for manual entry of the expected peak 5 position and use of a default level for the FWHM. The peak 5 position may also be derived from an average of the field glow curves. However, it is preferable to use the quality control cards to establish standards for evaluation of characteristics of the glow curves of the field dosimeters.

3. Evaluate Total Integral

In block 33, the total integral for the field dosimeter is computed. The total integral is the total area under the glow curve. If the total integral is less than a predetermined threshold value, the dosimeter is reporting less than a meaningful dose. Accordingly, the curve is ignored and no further evaluation is performed. Flow control then proceeds to the next glow curve.

4. Evaluate Glow Curve Saturation

In block 34, readout saturation is evaluated by looking for a flat top in the TL spectrum. This is done by:

i. Determining maximum glow curve point using a sliding 3 channel window. For the point to be a maximum the center channel should not exceed a predetermined limit that may be empirically defined for the given application.

ii. Counting the number of channels that are within an empirically defined percentage, for example 3%, of the maximum glow curve value using the same sliding 3 channel window.

ii. If the number of channels counted exceeds an empirically defined maximum limit, for example 15, then the curve is deemed saturated and a corresponding error is reported.

5. Eliminate Outliers

In block 35, outlier points are removed from the initial spectrum. An outlier is a discrete point on the curve which, judging from its amplitude, is likely to arise from instrument malfunction rather than from statistical fluctuation. More particularly, an outlier $y_i$ is an individual point that is radically different from the adjacent points on either side.

First the absolute maximum value is determined. This is accomplished by initially setting the absolute maximum value to zero. Then for each of the 200 channels, the current channel is compared to the current absolute maximum value. If greater, the following is done:

i. The average of the neighbor channels (one channel to each side of current channel) is determined. If this average is less than zero the average is set to a small value (0.001).

ii. If the current channel value divided by the average value is less than an empirically defined value, for example 1.5, the absolute maximum value is set to the current channel value.

Next, for each channel on the curve, the average of the neighbor channels (one channel to each side) is determined. If this average is less than 0 set to the small value (0.001). If the absolute value of the current channel minus the average value computed above divided by the absolute maximum value is greater than 0.1, then replace the current channel value with the average of it's neighbors. This will remove the spikes in the glow curve. Specifically, an outlier $y_i$ is an observation satisfying the condition:

$$|y_i - y^0_i|/y_{max} > 0.1$$

where $$y^0_i = 0.5 * (y_{i-1} + y_{i+1})$$

is the corresponding average of the immediate neighboring channels. An outlier is removed by replacing $y_i$ with $y^0_i$.

If the original channel value divided by the average is greater than an empirically derived value, for example 2.0, and this channel value divided by the absolute maximum value is greater than an empirically derived value, for example 0.5, then this is a spike. A counter may be incremented to count the number of spikes.

6. Smooth the Glow Curve

In block 36, a method of weighted averaging is used to filter out glow curve noise (spikes and scattered TL data) caused by the dosimeter and by instrument electronics. The averaging may be done iteratively for adjacent channels. For example, weighting factors may used in conventional manner to give a respectable smoothing without altering the original features of the glow curve. The curve may be smoothed in both directions from channels 1 to 200 then 200 to 1.

7. Evaluate Noise Level

In block 37, an evaluation of the noise level of the glow curve is made, the noise level being characterized by the number of outlier points and by the extent of the TL scatter. The latter is estimated by comparing the spectra before and after smoothing. Let $\{x_i, y_i\}$ be the initial spectrum and $\{x_i, y_{i'}\}$ the smoothed spectrum, the extent of TL scatter can be measured by $$S = \sum_{i=1}^{N} (y_i - y_{i'})^2 / y^2_{max}$$

If the estimated noise level exceeds a pre-set threshold (for example 2.0), the glow curve is rejected due to spikes or scattered TL.

8. Find and Evaluate Number of Glow Curve Peaks

In block 38, peaks are automatically found by searching for local maximum, which is defined as the highest points in a region of ±10 channels from a putative apex. In no local maximum was found, then no peaks were found and the associated error is reported and the next glow curve is processed. If the number of local maximums exceed a predetermined limit, for example 10, then too many peaks are found and a corresponding error is reported.

9. Identify Peak 5 and Evaluate Location, Height and Separation

In block 39, the main dosimetric peak, peak 5 (for LiF:Mg,Ti), is identified as the one closest to the expected peak location (as defined by the standard discussed above). If the nearest peak location is outside of an expected region, a corresponding error is reported. The nearest peak is also compared to the other peaks to see if it is the highest peak. If it is not the highest peak, a corresponding error is reported. Also, a check is made to see if any other peaks are in the peak 5 region and, if so, a corresponding error code is reported.

10. Evaluate Low Temperature Component

In block 40, the low temperature region of the glow curve is evaluated. The low temperature region is the region representing the low temperature component of the glow curve extending, for example, from channel 1 to channel 40 in a typical 200 channel glow curve. The evaluation is carried out as follows:

i. The integral of the low temp region is calculated.

ii. The integral of the peak region is determined. The peak region of a typical 200 channel glow curve obtained by the aforesaid readers is defined as 40 channels left of peak 5 and 20 channels right of peak 5.

iii. The ratio (R1) of the low temp integral to the peak region integral is determined.

iv. The excess of the low temp region (R2) is estimated by fitting the low temp side of peak 5 to an exponential.

v. If R1 is greater than a user defined maximum low temperature input value or R2 is greater than an empirically derived value, for example 5.0, then there is a large low temp component and a corresponding error is reported.

11. Find Inflection Point at High Temperature Side of Glow Curve

In block 41, the inflection point on the high-temperature side of Peak 5 is determined. This point is found either by searching for a local minimum immediately to the right of Peak 5, or in the case where no local minimum exists, by utilizing the curve slope information. The procedure is as follows:

i. If the peak to the immediate right of peak 5 is at least 5% in height (over its own baseline level) relative to peak 5, look for the local minimum on the right of peak 5. Otherwise, use the slope change approach.

ii. Using the slope change approach, search for the glow curve turning point using the tail portion slope as a reference. The change in slope must be larger than a predetermined threshold for at least 4 out of 6 consecutive samplings to avoid fluctuation.

iii. If no turning point is found before channel number 195 or the tail portion has a large negative slope then the glow curve is incomplete or marginally complete.

iv. A check also is made to see if the glow curve returns to baseline just before the end of the acquisition period. If the height of the last channel is less than 5% of the maximum height, the glow curve is identified as marginally complete.

v. If an inflection point cannot be found or the glow curve is otherwise determined in the foregoing manner to be incomplete or marginally complete, a corresponding error indicative of an incomplete glow curve is reported.

12. Evaluate Size of Infra-red Tail

In block 42, the high temperature or tail region is evaluated. This region is the last 20 channels of the glow curve in a typical 200 channel glow curve. The evaluation is performed as follows:

I. Calculate the integral for the high temp region as discussed above.

ii. Determine the peak 5 region as discussed above. The peak region is defined as 40 channels left of peak 5 and 20 channels right of peak 5.

iii. Integrate the peak region.

iv. Determine the ratio of the high temperature integral to the peak region integral.

v. If this ratio is greater than the empirically derived limit, for example 0.2, there is high IR or residual signal and a corresponding error is reported.

13. Evaluate Background Level

For a complete glow curve, the baseline is fitted in block 43 to an exponential function:

$$y = \exp{(a+bx)},$$

where x is the channel number, y is the background level at channel x, a and b are parameters to be extracted from the fit. The sampling points used in the fit are the first N channels with constant background and the points in the high temperature region which is dominated by the temperature-dependent background, due mainly to infrared radiation (IR) by hot TL element and detector parts. The background signal can be calculated by integrating the area under the fitted background curve. If the ratio of background signal to the total signal is greater than the limit pre-specified by the user, a corresponding error signal is reported. A net glow curve can be obtained by subtracting the background signal from the raw TL response for every channel.

14. Evaluate Width of Peak 5

In block 44, the width of the main glow peak is evaluated. The glow peak width is measured by its full width at half maximum (FWHM). A maximum acceptable value of FWHM is determined based on the information obtained from the QC card records in the same group or from predefined values set by the user if the QC cards are not used. The FWHM is compared to the maximum acceptable limit. This limit is determined by using the maximum FWHM from the QC glow curves plus 3 times maximum sigma width determined from the QC glow curves. A very wide glow curve structure usually is an indication of poor heat transfer and hence should be rejected.

If a glow curve is rejected by the algorithm as a result of a failure from the evaluation criteria, an online message may be displayed on display 14 (FIG. 1) stating the dosimeter ID and reason of rejection. Upon completion of the program a summary report is created and printed by printer 15 and/or stored in the storage device 14 for later review. Information in the report may include, for example, the user-specified values of glow curve acceptance criteria, the number of dosimeters processed and a list of all glow curves rejected along with reasons of rejection. In addition to the glow curve rejection report, a file containing values of all parameters used in glow curve evaluation also becomes available at the end of program execution. It contains information for individual glow curves as well as their statistical values which are useful in extracting the radiation induced signal.

It is again pointed out that although this method was developed specifically for analyzing LiF glow curves, it can be modified with reasonable ease to extend its scope to include glow curves from other types of TL materials.

It should now be apparent from the foregoing description that the method, as an important advantage, may be executed automatically by a computer, i.e., without the need of human intervention, thereby enabling sequential automatic analysis of glow curves for a plurality TL elements. After any needed batch processing information is inputted, the glow curves for plural TL elements can be analyzed automatically.

While the invention has been described with particular reference to a general purpose programmable computer with or without programmed read only memory, it will be understood that the features of the invention which are presently programmed in software form may be embodied in hardware form.

Although the invention has been shown and described with respect to a preferred embodiment, equivalent alterations and modifications will occur to others skilled in the art upon the reading and understanding of this specification. The present invention includes all such equivalent alterations and modifications, and is limited only by the scope of the following claims.

What is claimed is:

1. A method of evaluating glow curve data obtained with a thermoluminescent dosimetry reader wherein such glow curve data is composed of the superposition of plural overlapping glow peaks plus instrumental and dosimeter background, comprising the steps of:

(a) acquiring composite glow curve-data of at least one field dosimeter to be evaluated and at least one quality control dosimeter of the same type as the field dosimeter, the quality control dosimeter having been exposed to a predetermined quantity of radiation for providing a predictable glow curve, and (b) evaluating the composite glow curve data of the field dosimeter to ascertain the presence of an abnormal condition, said evaluating step including the steps of:

(i) automatically using the glow curve data of the quality control dosimeter to establish a standard against which a corresponding value of the glow curve data of the field dosimeter is compared, and (ii) automatically comparing the corresponding value of the glow curve data against the standard and reporting an abnormal condition if the corresponding value falls outside a predetermined tolerance window.

2. A method as set forth in claim 1, wherein said standard is the full width at half maximum of a peak of the composite glow curve data.

3. A method as set forth in claim 2, wherein the dosimeters are composed of LiF:Mg,Ti.

4. An apparatus for evaluating a glow curve data obtained with a thermoluminescent dosimetry reader wherein such glow curve data is composed of the superposition of plural overlapping glow peaks plus instrumental and dosimeter background, comprising:

(a) means for acquiring composite glow curve data of at least one field dosimeter to be evaluated and at least one quality control dosimeter of the same type as the field dosimeter, the quality control dosimeter having been exposed to a predetermined quantity of radiation for providing a predictable glow curve, and (b) means for evaluating the composite glow curve data of the field dosimeter to ascertain the presence of an abnormal condition, said means for evaluating including:

(i) means for automatically using the glow curve data of the quality control dosimeter to establish a standard against which a corresponding value of the glow curve data of the field dosimeter is compared, and (ii) means for automatically comparing the corresponding value of the glow curve data against the standard and reporting an abnormal condition if the corresponding value falls outside a predetermined tolerance window.

5. An apparatus as set forth in claim 4, wherein said standard is the full width at half maximum of a peak of the composite glow curve data.

6. An apparatus as set forth in claim 5, wherein the dosimeters are composed of LiF:Mg,Ti.

* * * * *